US012537616B2

(12) United States Patent
Rey

(10) Patent No.: US 12,537,616 B2
(45) Date of Patent: Jan. 27, 2026

(54) FRAME SYNCHRONIZATION DETECTION WITH AN ADAPTIVE THRESHOLD

(71) Applicant: Cypress Semiconductor Corporation, San Jose, CA (US)

(72) Inventor: Claudio Rey, Chandler, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 265 days.

(21) Appl. No.: 18/328,701

(22) Filed: Jun. 2, 2023

(65) Prior Publication Data

US 2024/0405905 A1 Dec. 5, 2024

(51) Int. Cl.
*H04J 3/06* (2006.01)

(52) U.S. Cl.
CPC .................. *H04J 3/0632* (2013.01)

(58) Field of Classification Search
CPC ............... H04J 3/0632; H04L 27/2656; H04L 27/2675; H04L 7/042; H04W 56/0055; H04W 4/80
See application file for complete search history.

(56) References Cited

U.S. PATENT DOCUMENTS

| 6,396,953 | B1* | 5/2002 | Abbey | G06F 18/10 |
| --- | --- | --- | --- | --- |
| | | | | 375/150 |
| 6,438,187 | B1* | 8/2002 | Abbey | H04L 7/042 |
| | | | | 370/514 |
| 6,850,582 | B2* | 2/2005 | O'Shea | H04W 84/14 |
| | | | | 375/365 |
| 7,929,927 | B2 | 4/2011 | Norris et al. | |
| 9,794,056 | B1 | 10/2017 | Tamma et al. | |
| 10,511,431 | B2* | 12/2019 | Laugeois | H04B 1/70752 |
| 10,530,905 | B1 | 1/2020 | Rey et al. | |
| 10,819,544 | B2 | 10/2020 | Stanciu et al. | |
| 10,862,505 | B1 | 12/2020 | Rey et al. | |
| 10,862,728 | B1 | 12/2020 | Rey et al. | |
| 10,862,729 | B1 | 12/2020 | Rey et al. | |
| 11,545,982 | B2 | 1/2023 | Perin et al. | |
| 11,621,898 | B2 | 4/2023 | Stanciu et al. | |
| 2007/0211835 | A1* | 9/2007 | Inagawa | H04L 7/0058 |
| | | | | 375/343 |
| 2012/0069942 | A1* | 3/2012 | Knutson | H04L 27/2656 |
| | | | | 375/362 |
| 2018/0254925 | A1* | 9/2018 | Dutz | H04B 1/7183 |
| 2020/0313844 | A1* | 10/2020 | Arslan | H04L 25/067 |

(Continued)

FOREIGN PATENT DOCUMENTS

| EP | 3264701 B1 | 2/2019 |
| --- | --- | --- |
| EP | 3706380 A1 | 9/2020 |

(Continued)

*Primary Examiner* — Hoang-Chuong Q Vu

(57) ABSTRACT

A wireless device includes a receiver to receive a packet via one or more antennas. A frame synchronization detection circuit coupled to the receiver identifies a data pattern within a portion of the packet. A correlation circuit coupled to the frame synchronization detection circuit identifies one or more properties of the data pattern and computes one or more values of a correlation peak using a correlation method. An adaptive threshold circuit coupled to the correlation circuit determines a correlation threshold value using the one or more properties of the data pattern and the one or more values of the correlation peak.

20 Claims, 5 Drawing Sheets

(56) References Cited

U.S. PATENT DOCUMENTS

| | | | |
|---|---|---|---|
| 2022/0111257 A1* | 4/2022 | Tsur | A61B 5/6801 |
| 2023/0238989 A1* | 7/2023 | Ito | H04L 7/10 |
| | | | 370/329 |
| 2023/0291539 A1* | 9/2023 | Fort | H04B 7/2643 |

FOREIGN PATENT DOCUMENTS

| | | | |
|---|---|---|---|
| EP | 3737055 A1 | 11/2020 |
| EP | 3731478 A3 | 1/2021 |
| EP | 4064568 A1 | 9/2022 |

* cited by examiner

FRAME SYNCHRONIZATION DETECTION WITH AN ADAPTIVE THRESHOLD

TECHNICAL FIELD

The present disclosure pertains to wireless networks and, more specifically, to frame synchronization detection of various electronic devices communicating wirelessly, e.g., via a Bluetooth (BT) or Bluetooth® Low Energy (BLE) connection.

BACKGROUND

Personal area networks (PANs), such as Bluetooth (BT), Bluetooth® Low Energy (BLE), Zigbee®, infrared, and the like, use the 2.4 GHz radio frequency band to provide a wireless connection for various personal industrial, scientific, and medical applications. PANs generally use a packet-based protocol and have an architecture that includes central devices (CDs) and peripheral devices (PDs). A CD can communicate with multiple PDs.

Typically, data is transferred between a CD and a specific PD during a time allocated for the specific PD-CD communication link. At a designated time, a PD can tune in to receive messages and data from the CD and, in turn, communicate data to the CD. Additionally, a CD can sometimes use a broadcast mode, in which the same data is communicated to multiple PDs simultaneously. BLE networks have communication ranges similar to BT networks but have a considerably smaller power consumption and cost. Further, BLE devices often remain in a sleep mode and transition to an active mode when data communication is about to happen. BLE protocol also supports mesh networking, in which data can flow over multiple paths, and which does not rely on a rigid hierarchical structure of devices, often allowing the same devices to serve as CDs or PDs, depending on particular network conditions and topology.

DETAILED DESCRIPTION

Figure 1A:
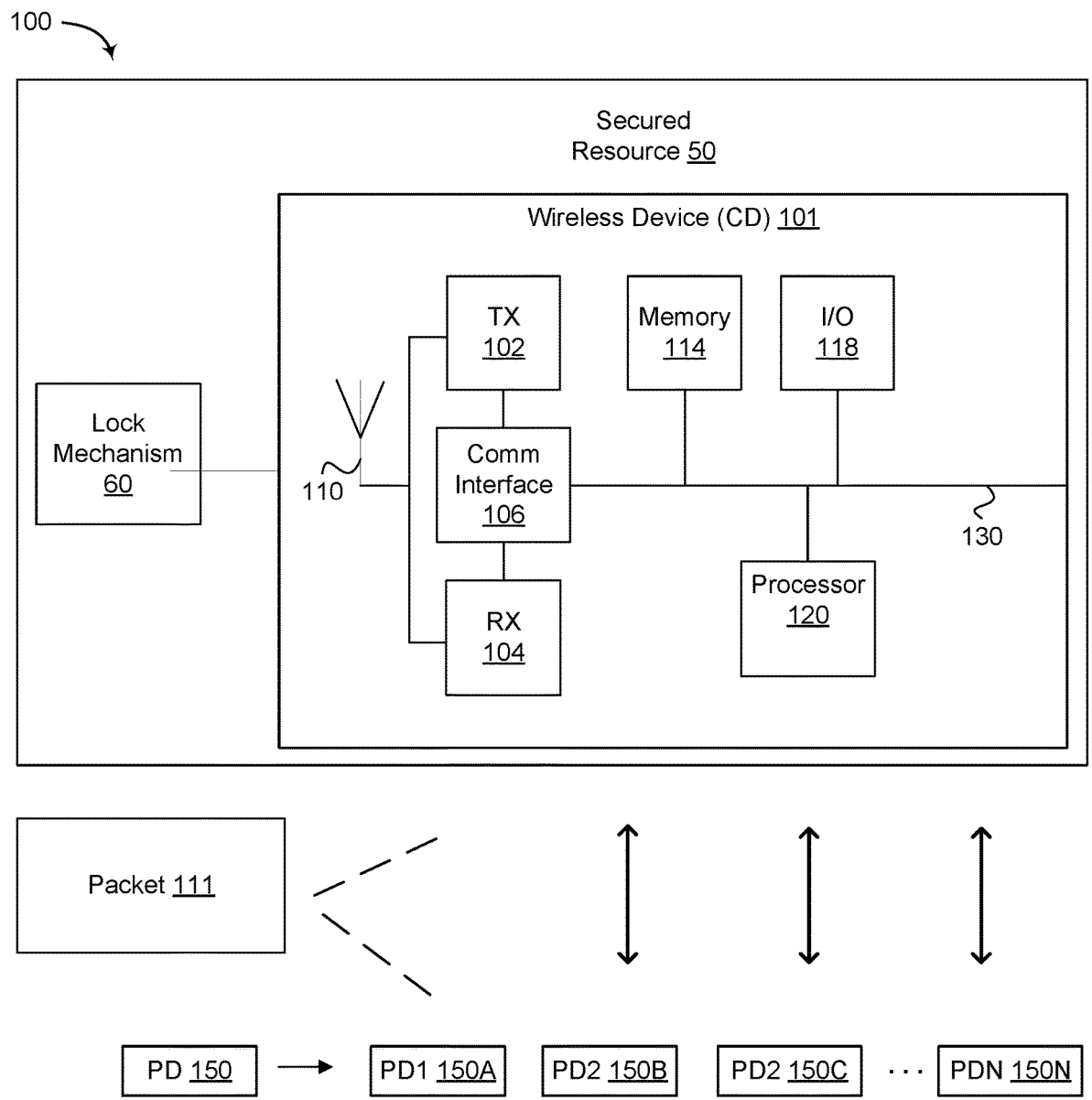
FIG. 1A is a block diagram of an example system for frame synchronization detection between a wireless device acting as a CD and a wireless device acting as a PD, in accordance with some implementations.

The following description sets forth numerous specific details, such as examples of specific systems, devices, components, methods, and so forth, in order to provide a good understanding of various embodiments of frame synchronization detection between wireless devices associated with a PAN. The disclosed principles may generally be applied to (Gaussian) Frequency Shift Keying ((G)FSK) modulation or to modulations with Offset Quadrature Phase Shift Keying (OQPSK) with sinewave shaping. Frame synchronization (or frame synch) detection may refer to detecting a frame delimiter, also referred to as a start frame delimiter (SFD), in a network packet that is identifying or signaling that data is to follow within a frame of the packet.

In certain PAN devices, frame synchronization detection can be used in order to aid in communication between wireless devices by identifying or signaling the data (i.e., payload data) that is to follow in a packet. Optionally, frame synchronization detection can also identify the sender of the packet. In certain PAN devices, frame synchronization can be used as part of distance estimation. For example, for BLE, distance estimation is achieved through a phase-based distance ranging method, or through packet exchanges in round trip timing (RTT) estimation, or a combination thereof to provide localization between wireless devices. In one example, data patterns (e.g., of digital "0s" and "1s") are used in RTT estimation to estimate the time of arrival (ToA) of a packet. In another example, BLE distance estimation can use the frequency estimated during the RTT estimation to synchronize the BLE distance estimation device to other BLE distance estimation devices through the correction of clocking errors and to estimate the frequency offset between devices. Additionally, BLE distance estimation can use data patterns to estimate frequency for use in security features, such as intrusion detection models.

Frame synchronization detection can be carried out at a sample rate that is a simple multiple (e.g., 4, 6, 8, 12 megahertz (MHz)) of the data symbol rate (e.g., 1 or 2 megabits per second (Mbps)). The sample rate and the data symbol rate are typically a divided (e.g., sampling) rate of the crystal oscillator (XO) frequency (e.g., 24, 32, or 48 MHz). The subsequent processing of the data symbols may be straightforward in being performed at known XO-integer-divided sample rates, and data patterns can be more easily correlated using bit decisions according to Boolean logic. Alternatively, signed soft symbols may be used to obtain more accurate results, in which case the correlation can be described as a number of multipliers, summations, and/or subtractions.

In practice, frame synchronization detection can require finding a peak of the magnitude of the correlation with known input data that satisfies (e.g., is greater than) a threshold value. In certain wireless devices, the threshold value can be a fixed value set to be as high as possible to avoid false noise detection but lower than an expected magnitude peak value of the correlation. An algorithm can be used to detect frame synchronization by computing a correlation magnitude peak value and determining that the correlation magnitude peak value is greater than the threshold value. In order to save power, computing the magnitude peak value of the correlation typically does not take into account the data patterns used in frame synchronization. However, the magnitude peak value of the correlation is often dependent on the data patterns. For example, due to the variation in data patterns, there can be variation of correlation peak magnitude and/or phase values. Each correlation magnitude peak value of a range of correlation magnitude peak values would thus need to be greater than the threshold value. In certain cases, the threshold value can be set to a value that is not lower than each correlation magnitude peak value of the range of correlation magnitude peak values. In certain cases, the threshold value can be set to a value that is not high enough to avoid false noise detection. As such, there can be a need for detecting frame synchronization using a threshold value that is adaptive to all of the data patterns and thus is as accurate as possible.

Aspects and implementations of the present disclosure address these and other limitations of the existing technology by enabling systems and methods of frame synchronization detection with an adaptive threshold. In one example implementation, a receiver of a wireless device receives a packet over a communication channel wirelessly (e.g., via one or more antennas). A frame synchronization detection circuit that is coupled to the receiver identifies a data pattern (e.g., a frame synchronization pattern) within a portion of the packet. A correlation circuit coupled to the frame synchronization detection circuit computes, in response to identifying the data pattern at the portion of the packet, one or more properties of the data pattern. The correlation circuit further computes one or more values near a correlation peak using a correlation method. An adaptive threshold circuit coupled to the correlation circuit determines a correlation threshold value using the one or more properties of the data pattern and the one or more values of the correlation peak. Numerous other implementations and multiple variations of these implementations are discussed below.

Advantages of the present disclosure may include using frame synchronization detection with an adaptive threshold in order to determine a correlation magnitude peak value that takes into account the various data patterns, thus providing a much more accurate RTT estimation while still being power efficient. Having a more accurate RTT estimation can, in turn, be used to estimate the time of arrival (ToA) of a packet. Thus, there can be an improvement in distance estimation devices for localization and ranging services, as well as for security applications, allowing for more accurate localization and ranging services in devices such as BLE distance estimation devices.

FIG. 1A is a block diagram of an example system for frame synchronization detection with an adaptive threshold between a wireless device 101 acting as a CD and a wireless device 150 acting as a PD, in accordance with some implementations. The system 100 can include a secured resource 50, e.g., that is secured using a lock mechanism 60, where the wireless device 150 is adapted to gain access to the secured resource 50 via the lock mechanism 60. The secured resource 50 can be, for example, a vehicle, a building, a residence, a garage, a shed, a vault, or the like. The secured resource 50 can also be a computer system, industrial equipment, or other items requiring secured access via the lock mechanism 60, which can be a digital locking mechanism, for example. In some embodiments, the lock mechanism is integrated together with the wireless device 101.

In some embodiments, the wireless device 150 is any one of multiple peripheral wireless devices PD1 150A, 150B, 150C . . . 150N, etc., as the wireless device 101 may be adapted to communicate with any or all of the peripheral wireless devices PD1 150A, 150B, 150C . . . 150N, etc. In some embodiments, the wireless device 101 is a mobile device such as a mobile phone, a smartphone, a pager, an electronic transceiver, a tablet, or the like. In some embodiments, the wireless device 150 can be adapted to gain access to the secured resource 50 by transmitting data encapsulated in a packet 111. The packet 111 can be transmitted from the wireless device 150 to the wireless device 101, as will be discussed in more detail. While the wireless device 101 is illustrated in detail, the wireless device 150 can also include the same or similar components as the wireless device 101 but are not repeated for simplicity.

In some embodiments, the wireless device 101 includes, but is not limited to, a transmitter 102 or TX (e.g., a PAN transmitter), a receiver 104 or RX (e.g., a PAN receiver), a communications interface 106, an antenna 110, a memory 114, one or more input/output (I/O) devices 118 (such as a display screen, a touch screen, a keypad, and the like), and a processor 120. These components may all be coupled to a communications bus 130. In some embodiments, the frequency offset, as described herein, is an offset (e.g., difference) between a frequency at the TX 102 and a frequency at the RX 104.

In some embodiments, a separate antenna is employed for each of the transmitter 102 and receiver 104, and so the antenna 110 is illustrated for simplicity. In some embodiments, the memory 114 includes storage to store instructions executable by processor 120 and/or data generated by the communications interface 106. In some embodiments, the one or more antennas (such as the antenna 110) described herein within various devices are used for PAN-based frequency bands, e.g., Bluetooth® (BT), BLE, Wi-Fi®, Zigbee®, Z-Wave™, and the like.

In some embodiments, the communications interface 106 is integrated with the transmitter 102 and the receiver 104, e.g., as a front-end of the wireless device 101. The communication interface 106 may coordinate, as directed by the processor 120, to request/receive packets (e.g., the packet 111) from the peripheral wireless device 150. The communications interface 106 may further process data symbols received by the receiver 104 in a way that the processor 120 can perform further processing, including detecting frame synchronization using an adaptive threshold by identifying a data pattern within the samples of data values obtained from a frame of the packet 111, identifying one or more properties of the data pattern, computing one or more values near a correlation peak using a correlation method, and determining a correlation threshold value using the one or more properties of the data pattern and the one or more values of the correlation peak, as discussed herein.

Figure 1B:
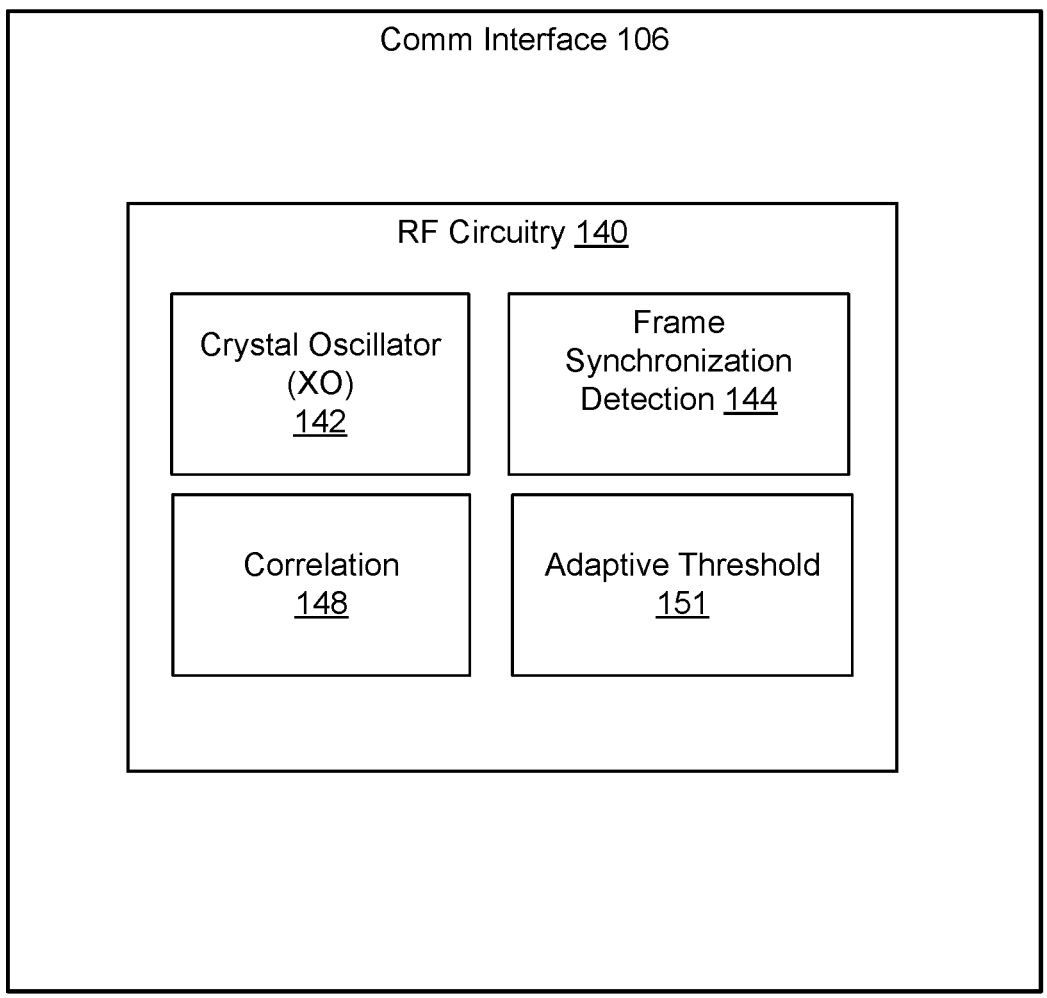
FIG. 1B is a simplified block diagram of the communication interface of the CD-based wireless device of FIG. 1A, in accordance with some implementations.

FIG. 1B is a simplified block diagram of the communication interface 106 of the CD-based wireless device 101 of FIG. 1A, in accordance with some implementations.

In some embodiments, the communication interface 106 includes RF circuitry 140, although the RF circuitry 140 discussed herein may also be coupled with the communication interface 106 and thus be located elsewhere within the front-end of the wireless device 101. In some embodiments, the RF circuitry 140 includes (or is coupled with) a crystal oscillator (XO) 142 and includes a frame synchronization detection circuit 144, a correlation circuit 148, and a fractional timing approximation circuit 149.

The XO 142 may provide a clock to govern sampling and processing in an XO-based frequency domain. In some embodiments, the RF circuitry 140 is implemented as a programmable processor, such as an application-specific integrated circuit (ASIC), field-programmable gate array (FPGA), a processing unit (such as a CPU or a GPU), or other microprocessor device that may include a combination of circuit-based hardware, logic, firmware, and/or software.

In some embodiments, the frame synchronization detection circuit 144 is configured to identify a data pattern within a portion of a packet received via the receiver 104. The data pattern can be a set of bits that include a pre-known data pattern that indicates or identifies when data is to follow within the frame of the packet. The correlation circuit 148 may be configured to identify one or more properties of the data pattern. The correlation circuit 148 may further be configured to compute one or more values near a correlation peak using the data samples from the received packet. The one or more values near the correlation peak can be computed using a correlation method, as described herein with respect to FIG. 2. The adaptive threshold circuit 151 may be configured to determine a correlation threshold value using the one or more properties of the data pattern and the one or more values of the correlation peak. Further details are described with reference to FIG. 3 herein.

Figure 1C:
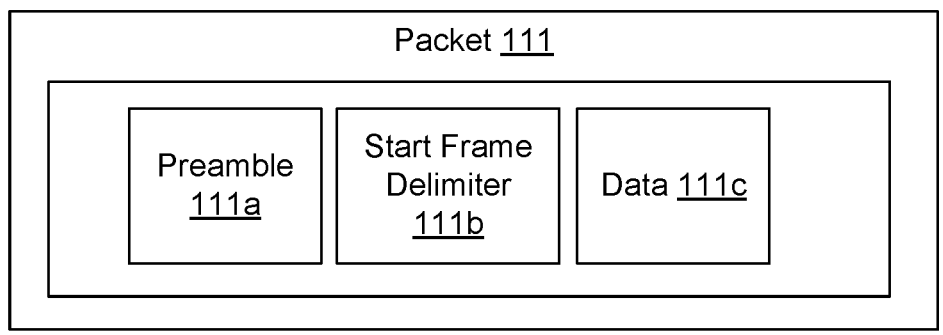
FIG. 1C is a simplified block diagram illustrating a packet received from a wireless device, in accordance with some implementations.

FIG. 1C is a simplified block diagram illustrating a packet 111 received from a wireless device (e.g., the PD 150 in FIG. 1A), in accordance with some implementations. As illustrated in FIG. 1C, the packet 111 can include, but is not limited to, a preamble 111a, a start frame delimiter 111b, and data 111c. The preamble 111a is typically a fixed number of bytes (e.g., seven bytes) that indicate or identify that data is to follow within a frame of a packet received by a receiver (e.g., the receiver 104 of FIG. 1A). The preamble 111a allows wireless devices (e.g., the wireless device 101 of FIG. 1A) to synchronize their receiver clocks with the transmitter clocks of wireless devices (e.g., the PD 150 in FIG. 1A). The start frame delimiter 111B is typically another fixed number of bytes (e.g., one byte) that indicates the end of the preamble 111a and the start of the frame with payload data (e.g., the data 111c).

Figure 2:
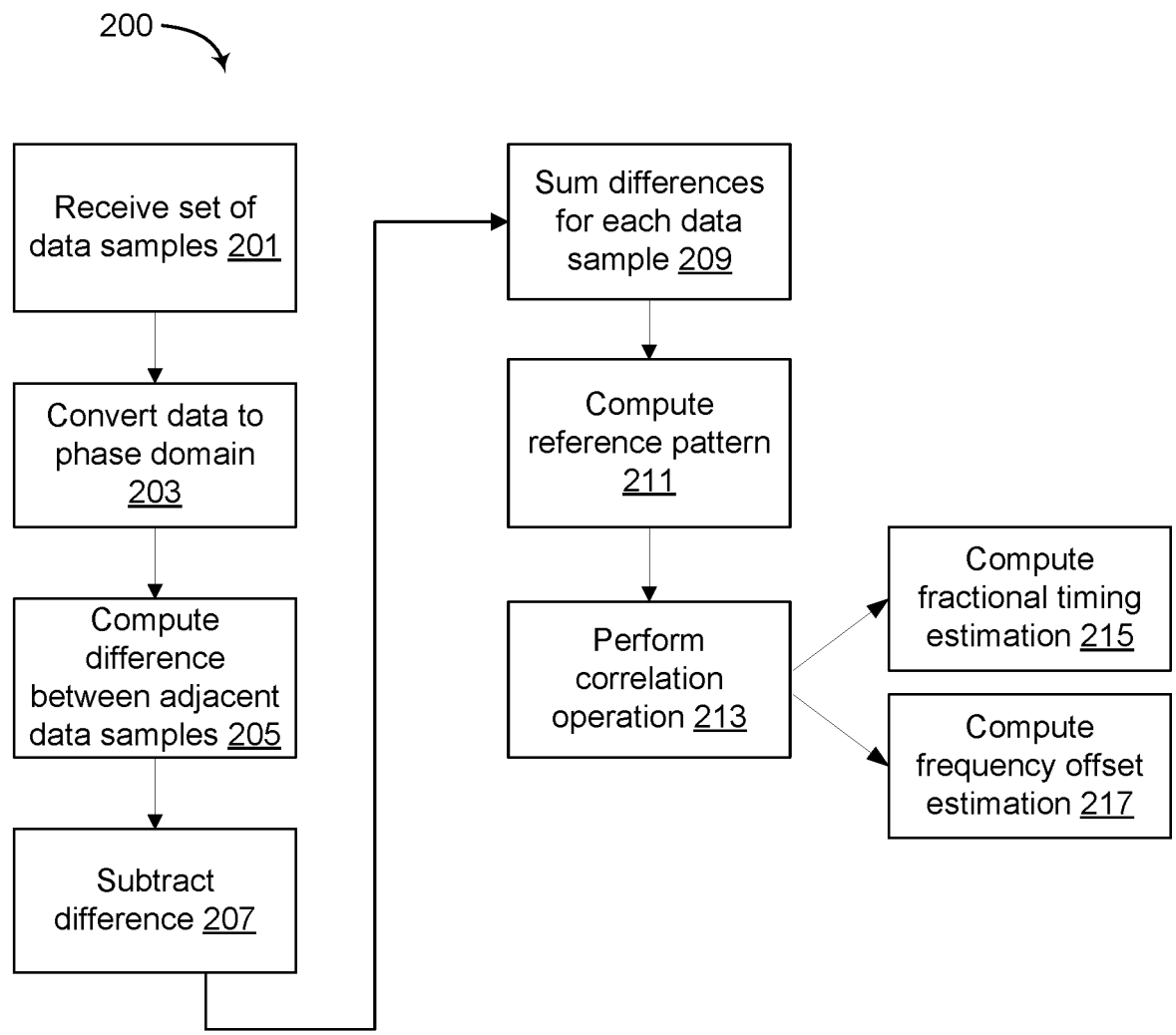
FIG. 2 is a flow diagram of an example method for performing frame synchronization detection with an adaptive threshold, in accordance with some implementations.

FIG. 2 is a flow diagram of an example method 200 for performing frame synchronization detection with an adaptive threshold, in accordance with some implementations. The method 200 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the communication interface 106 and/or the processor 120 of the wireless device 101 (e.g., as illustrated in FIGS. 1A-1B).

At operation 201, n data samples of a packet (e.g., the packet 111 of FIG. 1C) are received via a receiver (e.g., the receiver 104 of FIG. 1A) from a wireless device (e.g., the PD 150 of FIG. 1A). The data can be sampled at an integer rate (k) of a local oscillator (LO) bit rate. For example, the data can be sampled at a rate that is a simple multiple (e.g., 4, 6, 8, 12 MHz) of the data symbol rate (e.g., 1 or 2 Mbps), where the rates are a divided rate of the crystal oscillator (XO) frequency (e.g., at 24, 32, or 48 MHz).

The data samples can be used in order to obtain frequency estimation samples dS(n), i.e., the differential of the $n^{th}$ data sample, where the differential is over one symbol S. For example, in some embodiments, at operation 203, the data samples of the packet are converted into the in-phase domain (e.g., $\varphi(n)$). For example, the data samples can be converted into the in-phase domain using a mathematical equation that may be:

$$\varphi(n) = a\tan 2(I, Q),$$

where I is an in-phase domain value, and Q is a quadrature domain value.

At operation 205, the difference between adjacent data samples can be computed. In some embodiments, computing the difference between adjacent samples is performed by calculating the differential of adjacent phase domain data sample values. For example, the difference can be computed using a mathematical equation that may be:

$$d\varphi(n) = \varphi(n) - \varphi(n-1).$$

At operation 207, for each difference between adjacent samples computed at operation 205, the difference a symbol away from each sample can be subtracted. For example, the difference a symbol away can be subtracted using a mathematical equation that may be:

$$dS\varphi(n) = \frac{d\varphi(n) - d\varphi(n-k)}{k},$$

where k is the data oversampling ratio used in the receiver.

At operation 209, the differences for each data sample can be accumulated (e.g., summed up) in order to obtain the frequency estimation samples dS(n). In some embodiments, the differences are further scaled, using a value such as $\pi$ (i.e., pi) and a modulation index h (e.g., a fixed value such as 0.5). For example, the differences can be accumulated and scaled to obtain dS(n) using a mathematical equation that may be:

$$dS(n) = \pi h \sum\nolimits_{k=1}^{n} dS\varphi(k).$$

dS(n) is converted to the IQ domain:

$$dIQ(n) = e^{jdS(n)}$$

At operation 211, a reference data pattern can be computed. In some embodiments, the reference data pattern is a data pattern that is to be used in a correlation operation. When the reference data pattern matches a portion of the received data, the correlation operation generates a peak (in magnitude). The reference data pattern can be computed, for example, using a mathematical equation that may be:

$$Ref(n) = e^{-i\pi h(2\vartheta(n)-1)}.$$

In the mathematical equation above, $\vartheta(\eta)$ can be predetermined synchronization symbols that are found in BLE distance estimation devices.

At operation 213, a correlation operation can be performed in order to obtain a peak of the magnitude of the correlation and one or more values before and after the peak of the magnitude of the correlation (e.g., to generate fractional timing correctional values to the peak). In some embodiments, the correlation operation is performed using a mathematical equation using the computed reference data pattern and the computed frequency estimation samples dS(n) to compute a peak value. For example, the mathematical equation may be:

$$Corr(n) = \sum_{i=1}^{i=32} dIQ(n - i*k)Ref(i),$$

where k is the data oversampling ratio used in the receiver.

And:

$$\rho(n)e^{i\varphi(n)} = Corr(n),$$

where ρ(n) is the magnitude of the correlation and φ(n) is the phase of the correlation.

In some embodiments, the computed magnitude peak value can be a value that satisfies (e.g., is greater than) a fixed correlation threshold value. However, as described herein, the peak value can be dependent on properties of the data pattern. As such, the correlation threshold value should be less than a smallest computed magnitude peak value but high enough to avoid any false noise detection as described herein above. The correlation threshold value can be adapted to account for one or more properties of the data pattern, as described herein with respect to FIG. 3.

To compute the one or more values before and after the peak of the magnitude of the correlation, the processing logic can compute a fractional timing correctional value of the computed magnitude peak value (e.g., +/−0.25, +/−0.5, etc.). At operation 215, using the magnitude peak value in addition to the one or more values before and after the peak of the magnitude of the correlation, a fractional timing estimation can be computed. At operation 217, using the magnitude peak value in addition to the one or more values before and after the peak of the magnitude of the correlation, a frequency offset estimation can be computed.

It should be understood that the above mathematical equations are intended as examples and that various other schemes are possible, e.g., using different specific equations, accounting for different (or additional) corrections and/or values of the peak, etc., while still being within the scope of this disclosure.

Figure 3:
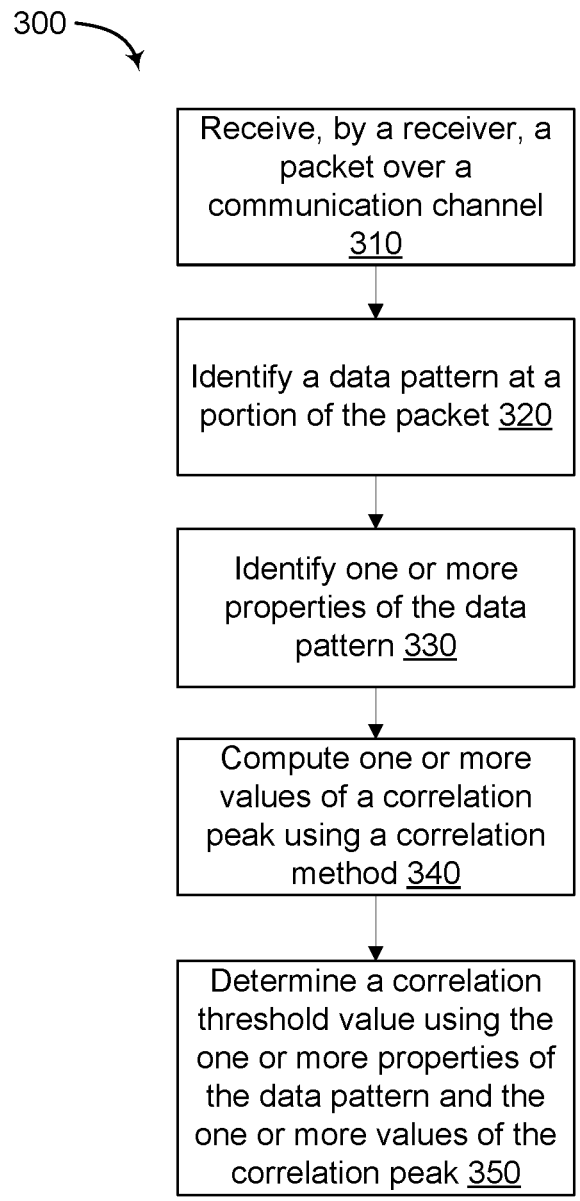
FIG. 3 is a flow diagram of another example method for performing frame synchronization detection with an adaptive threshold, in accordance with some implementations.

FIG. 3 is a flow diagram of an example method 300 for performing frame synchronization detection with an adaptive threshold, in accordance with some implementations. The method 300 may be performed by processing logic that can include firmware, hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the communication interface 106 and/or the processor 120 of the wireless device 101 (e.g., as illustrated in FIGS. 1A-1B).

At operation 310, the processing logic receives a packet. The packet can be received via a receiver (e.g., the receiver 104 of FIG. 1A). In some embodiments, the packet is the packet 111 of FIG. 1A and/or FIG. 1C. The packet can include a preamble, a start frame delimiter, and payload data, as described herein.

At operation 320, the processing logic identifies a data pattern (e.g., a frame synchronization pattern). The data pattern can be identified within a portion of the packet 111. In some embodiments, the data pattern is a sequence of bits from the preamble 111a and/or start frame delimiter 111b portions of the packet. Identifying the data pattern can include identifying a pre-known data pattern within the portion of the packet. The pre-known data pattern can be a set of bits in the sequence of bits from the preamble 111a, the start frame delimiter 111b portions of the packet, and/or a set of known symbols in a payload portion of the packet.

At operation 330, the processing logic identifies one or more properties of the data pattern. In some embodiments, identifying the one or more properties of the data pattern can include identifying one or more repeated symbols within the data pattern. The one or more repeated symbols can include, e.g., one or more repeated "0s" and/or one or more repeated "1s". The processing logic can maintain a count of each repeated "0" and each repeated "1" within the data pattern. Maintaining a count can include maintaining a counter for each symbol, such as a counter for repeated "0s" and a counter for repeated "1s". Each counter can be set to an initial value (e.g., 0). For example, the data pattern can be "0010101100." Within this example data pattern, the processing logic can identify a first bolded "00" as a repeated symbol. In response to identifying the first bolded "00" as a repeated symbol, the processing logic can increment the counter for repeated "0s" by a value (e.g., an integer or non-integer value, such as 1). The processing logic can identify a bolded "11" as a repeated symbol. In response to identifying the bolded "11" as a repeated symbol, the processing logic can increment the counter for repeated "1s" by a value (e.g., an integer or non-integer value, such as 1). The processing logic can identify another bolded "00" as a repeated symbol at the end of the data pattern. In response to identifying the other bolded "00" as a repeated symbol, the processing logic can increment the counter for repeated "0s" by a value (e.g., an integer or non-integer value, such as 1). In some embodiments, the processing logic can compute a sum of the number of repeated symbols. Computing the sum of the number of repeated symbols can include additively computing the value of each counter. For example, using the previous example, the processing logic can identify that the counter for repeated "0s" has a current value (e.g., count) of 2, where 2 is the number of repeated "0s" found within the data pattern. The processing logic can also identify that the counter for repeated "1s" has a current value (e.g., count) of 1, where 1 is the number of repeated "1s" found within the data pattern. In some embodiments, the processing logic can store the computed sum in a data structure, such as a look-up table. In some embodiments, the sum of each different repeated symbol can be computed separately. In some embodiments, the computed sum of each different repeated symbol can be stored separately, e.g., in a separate data structure.

In some embodiments, identifying the one or more properties of the data pattern can include identifying one or more non-repeated symbols within the data pattern. The one or more non-repeated symbols can include, e.g., one or more non-repeated "0s" and/or one or more non-repeated "1s". The processing logic can maintain a count of each non-repeated "0" and each non-repeated "1" within the data pattern. Maintaining a count can include maintaining a counter for each symbol, such as a counter for non-repeated "0s" and a counter for non-repeated "1s". Each counter can be set to an initial value (e.g., 0). For example, the data pattern can be "0010101100." Within this example data pattern, the processing logic can identify a first bolded "1" as a non-repeated symbol. In response to identifying the first bolded "1" as a non-repeated symbol, the processing logic can increment the counter for non-repeated "1s" by a value (e.g., an integer or non-integer value, such as 1). The processing logic can identify a bolded "0" as a non-repeated symbol. In response to identifying the bolded "0" as a non-repeated symbol, the processing logic can increment the counter for non-repeated "0s" by a value (e.g., an integer or non-integer value, such as 1). The processing logic can identify another bolded "1" as a non-repeated symbol. In response to identifying the other bolded "1" as a non-repeated symbol, the processing logic can increment the counter for non-repeated "1s" by a value (e.g., an integer or non-integer value, such as 1). The processing logic can further identify another bolded "0" as a non-repeated symbol at the end of the data pattern. In response to identifying the other bolded "0" as a non-repeated symbol, the processing logic can increment the counter for non-repeated "0s" by a value (e.g., an integer or non-integer value, such as 1). In some embodiments, the processing logic can compute a sum of the number of non-repeated symbols. Computing the sum of the number of non-repeated symbols can include additively computing the value of each counter. For example, using the previous example, the processing logic can identify that the counter for non-repeated "0s" has a current value (e.g., count) of 2, where 2 is the number of non-repeated "0s" found within the data pattern. The processing logic can also identify that the counter for non-repeated "1s" has a current value (e.g., count) of 1, where 1 is the number of non-repeated "0s" found within the data pattern. In some embodiments, the processing logic can store the computed sum in a data structure, such as a look-up table. In some embodiments, the sum of each different non-repeated symbol can be computed separately. In some embodiments, the computed sum of each different non-repeated symbol can be stored separately, e.g., in a separate data structure.

In some embodiments, identifying the one or more properties of the data pattern can include identifying one or more singleton zeros and/or singleton ones within the data pattern (e.g., any isolated 0s or is in a sequence of bits, such as the following bolded 0s and 1s: "0 1 0 0 1 0 0 0"). In some embodiments, the processing logic can compute a sum of the number of singletons (e.g., the number of singleton zeros and/or the number of singleton ones). Computing the sum of the number of singletons can include additively computing the value of each counter. For example, using the previous example, the processing logic can identify that the counter for singleton zeros has a current value (e.g., count) of 2, where 2 is the number of singleton zeros found within the data pattern. The processing logic can also identify that the counter for singleton ones has a current value (e.g., count) of 1, where 1 is the number of singleton ones found within the data pattern. In some embodiments, the processing logic can store the computed sum in a data structure, such as a look-up table. In some embodiments, the sum of the one or more singleton zeros can be referred herein as $S(1,1)$. In some embodiments, the sum of the one or more singleton ones can be referred herein as $S(1,2)$.

In some embodiments, identifying the one or more properties of the data pattern can include identifying one or more transition zeros and/or transition ones within the data pattern (e.g., any transition 0s and 1s in a sequence of bits, such as the following bolded 0s and 1s: "0 1 0 0 1 0 0 0 0 0"). In some embodiments, the processing logic can compute a sum of the number of transition zeros and/or the number of transition ones. Computing the sum of the number of transition zeros and/or the number of transition ones can include additively computing the value of each counter. For example, using the previous example, the processing logic can identify that the counter for transition zeros has a current value (e.g., count) of 2, where 2 is the number of transition zeros found within the data pattern. The processing logic can also identify that the counter for transition ones has a current value (e.g., count) of 1, where 1 is the number of transition ones found within the data pattern. In some embodiments, the processing logic can store the computed sum in a data structure, such as a look-up table. In some embodiments, the sum of the one or more transition zeros can be referred herein as $S(2,1)$. In some embodiments, the sum of the one or more transition ones can be referred herein as $S(2,2)$.

In some embodiments, identifying the one or more properties of the data pattern can include identifying one or more non-transition zeros and/or non-transition ones within the data pattern (e.g., any transition 0s and 1s in a sequence of bits, such as the following bolded 0s and 1s: "0 1 0 0 1 0 0 0 0 0"). In some embodiments, the processing logic can compute a sum of the number of any non-transition 0s and 1s in a sequence of bits, such as the following bolded 0s and 1s: "0 1 0 0 1 0 0 0 0 0". Computing the sum of the number of non-transition 0s and 1s can include additively computing the value of each counter. For example, using the previous example, the processing logic can identify that the counter for non-transition zeros has a current value (e.g., count) of 2, where 2 is the number of non-transition zeros found within the data pattern. The processing logic can also identify that the counter for non-transition ones has a current value (e.g., count) of 1, where 1 is the number of non-transition ones found within the data pattern. In some embodiments, the processing logic can store the computed sum in a data structure, such as a look-up table. In some embodiments, the sum of the one or more non-transition zeros can be referred herein as $S(3,1)$. In some embodiments, the sum of the one or more non-transition ones can be referred herein as $S(3,2)$.

In some embodiments, identifying the one or more properties of the data pattern can include identifying one or more singleton zeros, one or more singleton ones, one or more transition zeros, one or more transition zeros, one or more non-transition zeros, and/or one or more non-transition ones within the data pattern as described herein. The processing logic can compute the sum of a combination of one or more of each identified singleton zeros, singleton ones, transition zeros, transition ones, non-transition zeros, non-transition ones, etc., as described herein. In some embodiments, the processing logic can store the computed sum in a data structure, such as a look-up table as described herein.

At operation 340, the processing logic computes one or more values near a correlation peak. For example, the one or more values near the correlation peak can include the peak value, a value before the peak value, and a value after the peak value. In some embodiments, the processing logic computes the one or more values near the correlation peak using a correlation method. For example, the processing logic can compute the one or more values near the correlation peak using the correlation method described with respect to FIG. 2. In some examples, the processing logic can compute the one or more values near the correlation peak using other methods of correlation not specifically described herein or known at the present time.

At operation 350, the processing logic determines a correlation threshold value. In some embodiments, the processing logic can determine the correlation threshold value using the one or more properties of the data pattern identified at operation 330 and the one or more values of the correlation peak computed at operation 340. In some embodiments, determining the correlation threshold value can include computing an estimated correlation peak using the one or more properties of the data pattern identified at operation 330 and the one or more values of the correlation peak computed at operation 340. For example, in some embodiments, the processing logic uses a mathematical equation to estimate the correlation peak, such as:

$$\text{CorrPeak} = S(1,2)e^{jk_1} + S(1,1)e^{-jk_1} + S(2,2)e^{jk_2} + S(2,1)e^{-jk_2} + S(3,2)e^{jk_3} + S(3,1)e^{-jk_3}.$$

In the above mathematical equation, the value $S(1,2)$ is the determined sum of singleton ones; the value $S(1,1)$ is the determined sum of singleton zeros; the value S(2,2) is the determined sum of transition ones; the value S(2,1) is the determined sum of transition zeros; the value S(3,2) is the determined sum of non-transition ones; and the value S(3,1) is the determined sum of non-transition zeros. In some embodiments, the processing logic assigns (e.g., multiplies) a weighted value k (e.g., a fixed integer or non-integer value) by each determined sum of a unique data pattern, i.e., a weighted value $k_1$ is assigned to the determined sum of singleton patterns, a weighted value $k_2$ is assigned to the determined sum of transition patterns, and a weighted value $k_3$ is assigned to the determined sum of non-transition patterns. In some embodiments, there are other values not reflected in the above-described mathematical equation that can reflect determined sums of other data patterns not described herein. For example, there can be a weighted value $k_4$ assigned to a bias value, a weighted value $k_5$ assigned to another bias value, etc. The weighted value k can be computed using calibration and/or through simulation during offline testing.

In some embodiments, in response to computing the estimated correlation peak using the above mathematical equation, the processing logic can compute the peak magnitude value of the estimated correlation peak, using the following operation:

$$|CorrPeak|$$

In response to computing the peak magnitude value of the estimated correlation peak, the processing logic can compute the correlation threshold value. Computing the correlation threshold value can be performed using a mathematical equation, such as:

$$Thresh = K|CorrPeak|,$$

where K is a constant (e.g., fixed) value. In some embodiments, K can be a value between 0 and 1. In some embodiments, K can be a value such as 0.75.

FIGS. 2-3 are not intended to limit the methods described therein to certain combinations, permutations, or assignment of actors, i.e., whether a PD or CD actually performs a particular operation. Rather, they are meant to be indicative of some implementations of this disclosure, and one skilled in the art will recognize that some operations may be rearranged for particular applications, some operations need not always be performed, some operations may be omitted, etc.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware, or code set forth above may be implemented via instructions or code stored on a machine-accessible, machine-readable, computer-accessible, or computer-readable medium, which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific example implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and/or other example language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A system comprising:
 a wireless device; and
 one or more antennas, the wireless device comprising:
  a receiver to receive a packet via the one or more antennas;

a frame synchronization detection circuit coupled to the receiver to identify a data pattern within a portion of the packet; and a correlation circuit coupled to the frame synchronization detection circuit to:

identify one or more properties of the data pattern; and compute one or more values of a correlation peak using a correlation method; and an adaptive threshold circuit coupled to the correlation circuit to:

determine a correlation threshold value using the one or more properties of the data pattern and the one or more values of the correlation peak.

2. The system of claim 1, wherein to identify the data pattern, the frame synchronization detection circuit is further to identify a pre-known data pattern within the portion of the packet indicative of a start of a frame in the packet, wherein the pre-known data pattern comprises a plurality of bits.

3. The system of claim 1, wherein to identify the one or more properties of the data pattern, the correlation circuit is further to:

identify one or more repeated symbols within the data pattern;

compute a sum of the one or more repeated symbols within the data pattern; and store the sum of the one or more repeated symbols in a look-up table.

4. The system of claim 1, wherein to identify one or more properties of the data pattern, the correlation circuit is further to:

identify one or more non-repeated symbols within the data pattern;

compute a sum of the one or more non-repeated symbols within the data pattern; and store the sum of the one or more non-repeated symbols in a look-up table.

5. The system of claim 1, wherein to identify the one or more properties of the data pattern, the correlation circuit is further to:

determine at least one of:

a sum of one or more singleton zero patterns within the data pattern; and a sum of one or more singleton one patterns within the data pattern.

6. The system of claim 1, wherein to identify the one or more properties of the data pattern, the correlation circuit is further to:

determine a sum of one or more transition zero patterns;

determine a sum of one or more transition one patterns; and determine at least one of:

a sum of one or more singleton zero patterns within the data pattern; and a sum of one or more singleton one patterns within the data pattern.

7. The system of claim 1, wherein to identify the one or more properties of the data pattern, the correlation circuit is further to:

determine a sum of one or more non-transition zero patterns;

determine a sum of one or more non-transition one patterns; and determine at least one of:

a sum of one or more singleton zero patterns within the data pattern; and a sum of one or more singleton one patterns within the data pattern.

8. A method of operating a wireless device, the method comprising:

receiving a packet over a communication channel;

identifying a data pattern within a portion of the packet;

identifying one or more properties of the data pattern;

computing one or more values of a correlation peak using a correlation method; and determining a correlation threshold value using the one or more properties of the data pattern and the one or more values of the correlation peak.

9. The method of claim 8, wherein identifying the data pattern comprises identifying a pre-known data pattern within the portion of the packet indicative of a start of a frame in the packet, wherein the pre-known data pattern comprises a plurality of bits.

10. The method of claim 8, wherein identifying the one or more properties of the data pattern comprises:

identifying one or more repeated symbols within the data pattern;

computing a sum of the one or more repeated symbols within the data pattern; and storing the sum of the one or more repeated symbols in a look-up table.

11. The method of claim 8, wherein identifying the one or more properties of the data pattern comprises:

identifying one or more non-repeated symbols within the data pattern;

computing a sum of the one or more non-repeated symbols within the data pattern; and storing the sum of the one or more non-repeated symbols in a look-up table.

12. The method of claim 8, wherein identifying the one or more properties of the data pattern comprises:

determining at least one of:

a sum of one or more singleton zero patterns within the data pattern; and a sum of one or more singleton one patterns within the data pattern.

13. The method of claim 8, wherein identifying the one or more properties of the data pattern comprises:

determining a sum of one or more transition zero patterns;

determining a sum of one or more transition one patterns; and determining at least one of:

a sum of one or more singleton zero patterns within the data pattern; and a sum of one or more singleton one patterns within the data pattern.

14. The method of claim 8, wherein identifying the one or more properties of the data pattern comprises:

determining a sum of one or more non-transition zero patterns;

determining a sum of one or more non-transition one patterns; and determining at least one of:

a sum of one or more singleton zero patterns within the data pattern; and a sum of one or more singleton one patterns within the data pattern.

15. A wireless device comprising:

a receiver to receive a packet over a communication channel;

a frame synchronization detection circuit coupled to the receiver to identify a data pattern within a portion of the packet;

a correlation circuit coupled to the frame synchronization detection circuit to:

identify one or more properties of the data pattern; and compute one or more values of a correlation peak using a correlation method; and an adaptive threshold circuit coupled to the correlation circuit to determine a correlation threshold value using the one or more properties of the data pattern and the one or more values of the correlation peak.

16. The wireless device of claim 15, wherein to identify the data pattern, the frame synchronization detection circuit is further to identify a pre-known data pattern within the portion of the packet indicative of a start of a frame in the packet, wherein the pre-known data pattern comprises a plurality of bits.

17. The wireless device of claim 15, wherein to identify one or more properties of the data pattern, the correlation circuit is further to:

identify one or more repeated symbols within the data pattern;

compute a sum of the one or more repeated symbols within the data pattern; and store the sum of the one or more repeated symbols in a look-up table.

18. The wireless device of claim 15, wherein to identify the one or more properties of the data pattern, the correlation circuit is further to:

identify one or more non-repeated symbols within the data pattern;

compute a sum of the one or more non-repeated symbols within the data pattern; and store the sum of the one or more non-repeated symbols in a look-up table.

19. The wireless device of claim 15, wherein to identify the one or more properties of the data pattern, the correlation circuit is further to:

determine at least one of:

a sum of one or more singleton zero patterns within the data pattern; and a sum of one or more singleton one patterns within the data pattern.

20. The wireless device of claim 15, wherein to identify the one or more properties of the data pattern, the correlation circuit is further to:

determine a sum of one or more transition zero patterns;

determine a sum of one or more transition one patterns; and determine at least one of:

a sum of one or more singleton zero patterns within the data pattern; and a sum of one or more singleton one patterns within the data pattern.

* * * * *